US008995286B2

(12) United States Patent
Naz et al.

(10) Patent No.: US 8,995,286 B2
(45) Date of Patent: Mar. 31, 2015

(54) AUTONOMOUS SELF-DISRUPTING NETWORK ELEMENT

(75) Inventors: Nausheen Naz, Ottawa (CA); Csaba Marton, Ottawa (CA); Suat R. Eskicioglu, Ottawa (CA); Manikka Thyagarajan, Ottawa (CA); Michael H. Lashley, Chateauguay (CA)

(73) Assignee: Alcatel Lucent, Boulogne-Billancourt (FR)

( * ) Notice: Subject to any disclaimer, the term of this patent is extended or adjusted under 35 U.S.C. 154(b) by 596 days.

(21) Appl. No.: 13/149,370

(22) Filed: May 31, 2011

(65) Prior Publication Data

US 2012/0307642 A1    Dec. 6, 2012

(51) Int. Cl.
| | |
|---|---|
| G01R 31/08 | (2006.01) |
| H04L 12/28 | (2006.01) |
| H04J 3/16 | (2006.01) |
| H04W 24/08 | (2009.01) |
| H04L 12/24 | (2006.01) |
| H04L 12/26 | (2006.01) |
| H04L 29/14 | (2006.01) |

(52) U.S. Cl.
CPC .............. *H04W 24/08* (2013.01); *H04L 41/142* (2013.01); *H04L 43/16* (2013.01); *H04L 43/18* (2013.01); *H04L 69/40* (2013.01)
USPC ............................. 370/247; 370/412; 370/465

(58) Field of Classification Search
CPC ........... H04J 3/14; H04L 47/00; H04L 47/14; H04L 47/90; H04L 43/16; H04L 43/00; H04L 43/50
USPC ......... 370/410–412, 419, 420, 241, 465–467, 370/329, 230–236, 238; 709/235, 232, 233, 709/238, 213
See application file for complete search history.

(56) References Cited

U.S. PATENT DOCUMENTS

| | | | | |
|---|---|---|---|---|
| 7,633,939 | B2 * | 12/2009 | Curran-Gray et al. | ......... 370/389 |
| 7,948,876 | B2 * | 5/2011 | Jacobson et al. | .............. 370/229 |

(Continued)

FOREIGN PATENT DOCUMENTS

| | | |
|---|---|---|
| CN | 102025560 A | 4/2011 |
| EP | 0910194 A | 4/1999 |

(Continued)

OTHER PUBLICATIONS

International Search Report for PCT/CA2012/050335 dated Sep. 12, 2012.

(Continued)

*Primary Examiner* — Hanh N Nguyen
(74) *Attorney, Agent, or Firm* — Kramer Amado, P.C.

(57) ABSTRACT

A method, apparatus, and machine readable storage medium is disclosed for establishing a test protocol processor which identifies and removes predetermined messages from a network element port buffer. Subsequent to removal the test protocol processor may perform one or more of several actions according to the results of statistical calculations. These actions include allowing the message to drop, replacing the message after a delay, replacing the message after altering the payload of the message, and replacing the message after altering the message type. The disclosed autonomous self disrupting network element is particularly useful for providing a means to perform in situ field testing of network performance indicators under desired statistical conditions.

34 Claims, 6 Drawing Sheets

(56) References Cited

U.S. PATENT DOCUMENTS

| | | | |
|---|---|---|---|
| 8,385,210 B1* | 2/2013 | Weill et al. | 370/238 |
| 8,595,393 B2* | 11/2013 | Thyagarajan et al. | 710/54 |
| 8,634,307 B2* | 1/2014 | Thyagarajan et al. | 370/245 |
| 2004/0199370 A1 | 10/2004 | Arama et al. | |
| 2005/0226149 A1 | 10/2005 | Jacobson et al. | |
| 2006/0140125 A1 | 6/2006 | Ottinger et al. | |
| 2007/0180106 A1 | 8/2007 | Pirzada et al. | |
| 2012/0307626 A1* | 12/2012 | Thyagarajan et al. | 370/225 |
| 2012/0307643 A1* | 12/2012 | Naz et al. | 370/241 |
| 2012/0311178 A1* | 12/2012 | Naz et al. | 709/234 |
| 2012/0311205 A1* | 12/2012 | Thyagarajan et al. | 710/105 |

FOREIGN PATENT DOCUMENTS

| | | |
|---|---|---|
| JP | 9107370 | 4/1997 |
| JP | 2006166425 | 6/2006 |
| WO | 2010024114 | 3/2010 |
| WO | 2010149226 | 12/2010 |

OTHER PUBLICATIONS

First Office Action for Japanese Application No. 2014-513016 dated Dec. 2, 2014.

* cited by examiner

AUTONOMOUS SELF-DISRUPTING NETWORK ELEMENT

CROSS-REFERENCE

This application cross-references the following co-pending application, incorporated by reference herein: application Ser. No. 13/149,473, "MESSAGE FLOW REROUTING FOR SELF-DISRUPTING NETWORK ELEMENT" to Thyagarajan et al., filed May 31, 2011.

This application cross-references the following co-pending application, incorporated by reference herein: application Ser. No. 13/149,514, "MESSAGE FLOW REROUTING FOR AUTONOMOUS SELF-DISRUPTING NETWORK ELEMENT" to Thyagarajan et al., filed May 31, 2011.

This application cross-references the following co-pending application, incorporated by reference herein: application Ser. No. 13/149,414, "SELF-DISRUPTING NETWORK ELEMENT" to Naz et al., filed May 31, 2011.

This application cross-references the following co-pending application, incorporated by reference herein: application Ser. No. 13/149,316, "FIELD-DEPLOYABLE PROTOCOL MESSAGE INTERCEPTOR" to Thyagarajan et al., filed May 31, 2011.

This application cross-references the following co-pending application, incorporated by reference herein: application Ser. No. 13/149,556, "FIELD-DEPLOYABLE MESSAGE COMPROMISER" to Naz et al., filed May 31, 2011.

FIELD OF THE INVENTION

The invention relates to generally to network element equipment testing and is particularly concerned with autonomous provisioning of test cases suitable for demonstrating the performance of network elements against performance indicators given certain statistical conditions.

BACKGROUND OF THE INVENTION

As demand increases for varying types of applications within mobile telecommunications networks, service providers constantly upgrade their systems in order to reliably provide an expanded functionality. What was once a system designed simply for voice communication has grown into an all-purpose network access point, providing access to a myriad of applications including text messaging, multimedia streaming, and general Internet access. In order to support such applications, providers have built new networks on top of their existing voice networks. As seen in second and third generation networks, voice services must be carried over dedicated voice channels and directed toward a circuit-switched core, while other service communications are transmitted according to the internet protocol (IP) and directed toward a different, packet-switched core. This led to unique problems regarding application provision, metering and charging, and quality of experience (QoE) assurance.

Call drops and establishment failures are two of the major issues in wireless networks that impact end user experience and cause customer dissatisfaction. Metrics have been defined to track these statistics in the networks to evaluate network performance. These metrics are termed as Network Key Performance Indicators (N-KPI).

Demonstration of Network Key Performance Indicators as impacted by a particular network element is difficult to do. If a particular network element, such as for example a Radio Network Controller (RNC) of the Universal Mobile Telecommunications Services (UTMS) is situated in a test facility, then it is difficult to ensure that the test equipment which is exercising the RNC is providing conditions matching a particular customer network given the variety of network equipment that a given customer's network may present. On the other hand, once the network equipment is deployed into the customer's network the contextual conditions presented are representative, but disentangling the contributions, positive or negative, of the specific network equipment element becomes difficult due to interoperability effects.

In view of the foregoing, it would be desirable to provide a method to test a network element in situ in a customer network. In particular, it would be desirable to provide a means by which the response of a particular network element to a plurality of problematic messaging conditions could be demonstrated under a given statistical regime.

SUMMARY OF THE INVENTION

According to one aspect of the invention there is disclosed a network element having a port having a port buffer; a standard protocol processor which processes messages stored in the port buffer; and a test protocol processor having access to the port buffer; wherein the test protocol processor is configured to: generate a first value according to a first statistical distribution in the event that a first protocol message stored in the port buffer corresponds to a predetermined message type; compare the first value to a first threshold; and remove the first protocol message from the port buffer if the first value is to one side of the first threshold. In some of these embodiments the first statistical distribution is one of the set of a uniform random distribution, a truncated Normal random distribution, a truncated Poisson random distribution, and a truncated exponential random distribution.

According to another embodiment the test protocol processor is further configured to generate a second value according to a second statistical distribution if the first value is to another side of the first threshold; compare the second value to a second threshold; associate a delay with the first protocol message if the second value is to one side of the second threshold; remove the first protocol message from the port buffer for a period of the associated delay; and then return the first protocol message to the port buffer. In some of these embodiments the second statistical distribution is one of the set of a uniform random distribution, a truncated Normal random distribution, a truncated Poisson random distribution, and a truncated exponential random distribution. According to some of these embodiments the delay is chosen from a range of delays having a lower delay limit and an upper delay limit. Also, in some of these embodiments a chance of the delay being a particular delay is defined by a random distribution. For these embodiments, some of the random distributions may be one of a uniform random distribution, a truncated Normal random distribution, a truncated Poisson random distribution, and a truncated exponential random distribution.

According to another embodiment the test protocol processor is further configured to, prior to the return step: generate a third value according to a third statistical distribution; compare the third value to a third threshold; and associate a change in message contents with the first protocol message if the third value is to one side of the third threshold; provide the associated change in message contents to the first protocol message. In some of these embodiments the third statistical distribution is one of the set of a uniform random distribution, a truncated Normal random distribution, a truncated Poisson random distribution, and a truncated exponential random distribution.

According to another embodiment the test protocol processor is further configured to, prior to the return step: generate a fourth value according to a fourth statistical distribution; compare the fourth value to a fourth threshold; and associate a change in message type with the first protocol message if the fourth value is to one side of the fourth threshold; provide the associated change in message type to the first protocol message. In some of these embodiments the associated change in message type is that of a failure message. In the fourth statistical distribution is one of the set of a uniform random distribution, a truncated Normal random distribution, a truncated Poisson random distribution, and a truncated exponential random distribution.

Advantageously, in some embodiments of the invention the port buffer is an input port buffer of the network element; and the test protocol processor removes the first protocol message prior to the standard protocol processor processing the message.

Advantageously, in other embodiments of the invention the port buffer is an output port buffer of the network element and the test protocol processor removes the first protocol message prior to transmission of the first protocol message from the port.

Advantageously, in some embodiments of the invention the predetermined message type is one of a plurality of predetermined message types.

According to another aspect of the invention there is disclosed a network element having: a port having a port buffer; a standard protocol processor which processes messages stored in the port buffer; and a test protocol processor having access to the port buffer; wherein the test protocol processor is configured to: generate a first value according to a first statistical distribution in the event that a first protocol message stored in the port buffer corresponds to a predetermined message type; select a condition to apply to the first protocol message according to the first value. In some of these embodiments the first statistical distribution comprises a weighted value corresponding to the condition.

According to another embodiment of the invention the test protocol processor is further configured to, during the selecting step, select a condition from among the set of removing the first protocol message from the port buffer, removing the first protocol message from the port buffer and replacing it after a delay, removing the first protocol message from the port buffer and replacing it after altering the message payload contents, and removing the first protocol message from the port buffer and replacing it after altering the message type. In some of these embodiments the message type is altered to that of a failure message. According to some of these embodiments the delay is chosen from a range of delays having a lower delay limit and an upper delay limit. Also, in some of these embodiments a chance of the delay being a particular delay is defined by a random distribution. For these embodiments, some of the random distributions may be one of a uniform random distribution, a truncated Normal random distribution, a truncated Poisson random distribution, and a truncated exponential random distribution.

According to another aspect of the invention there is disclosed a network element having: a port having a port buffer; a standard protocol processor which processes messages stored in the port buffer; and a test protocol processor having access to the port buffer; wherein the test protocol processor is configured to: generate a first value according to a first statistical distribution in the event that a first protocol message stored in the port buffer corresponds to a predetermined message type; select a combination of conditions to apply to the first protocol message according to the first value.

According to some versions of theses embodiments, the combination of conditions is one of removing the first protocol message from the port buffer; or alternatively: selecting at least one condition from among the set of conditions of removing the first protocol message from the port buffer and replacing it after a delay, removing the first protocol message from the port buffer and replacing it after altering the message payload contents, and removing the first protocol message from the port buffer and replacing it after altering the message type. In some embodiments involving altering the message type, the message type is altered to that of a failure message. According to some of these embodiments the delay is chosen from a range of delays having a lower delay limit and an upper delay limit. Also, in some of these embodiments involving a delay, a chance of the delay being a particular delay is defined by a random distribution. For these embodiments, some of the random distributions may be one of a uniform random distribution, a truncated Normal random distribution, a truncated Poisson random distribution, and a truncated exponential random distribution.

According to another aspect of the invention there is provided a method of testing a performance indicator for a network element having a port having a port buffer; a standard protocol processor which processes messages stored in the port buffer; a test protocol processor having access to the port buffer, and the test protocol processor configured to execute the method; the method having the steps of: generating a first value according to a first statistical distribution in the event that a first protocol message stored in the port buffer corresponds to a predetermined message type; and selecting a condition to apply to the first protocol message according to the first value.

In some embodiments of the invention the method has the further step of selecting, during the selecting step, a condition from among the set of removing the first protocol message from the port buffer, removing the first protocol message from the port buffer and replacing it after a delay, removing the first protocol message from the port buffer and replacing it after altering the message payload contents, and removing the first protocol message from the port buffer and replacing it after altering the message type; and then applying the selected condition. In some embodiments involving altering the message type, the message type is altered during the applying step to that of a failure message.

Advantageously, in some embodiments of the invention the port buffer from which a predetermined message may be removed is an input port buffer of the network element; and during the applying step the test protocol processor removes the first protocol message prior to the standard protocol processor processing the message.

Advantageously, in other embodiments of the invention the port buffer from which a predetermined message may be removed is an output port buffer of the network element and during the applying step the test protocol processor removes the first protocol message prior to transmission of the first protocol message from the port.

Advantageously, in some of these embodiments of the invention the predetermined message type is one of a plurality of predetermined message types.

Note: in the following the description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

BRIEF DESCRIPTION OF THE DRAWINGS

The present invention will be further understood from the following detailed description of embodiments of the invention, with reference to the drawings in which.

DETAILED DESCRIPTION

Referring now to the drawings, in which like numerals refer to like components or steps, there are disclosed broad aspects of various exemplary embodiments.

In use the invention is situated in a piece of network equipment which acts as a node in a network of network equipment. Embodiments of the present invention provide a self-disrupting network element wherein the network element itself can disrupt protocol messages received at the network element or transmitted from the network element.

Figure 1:
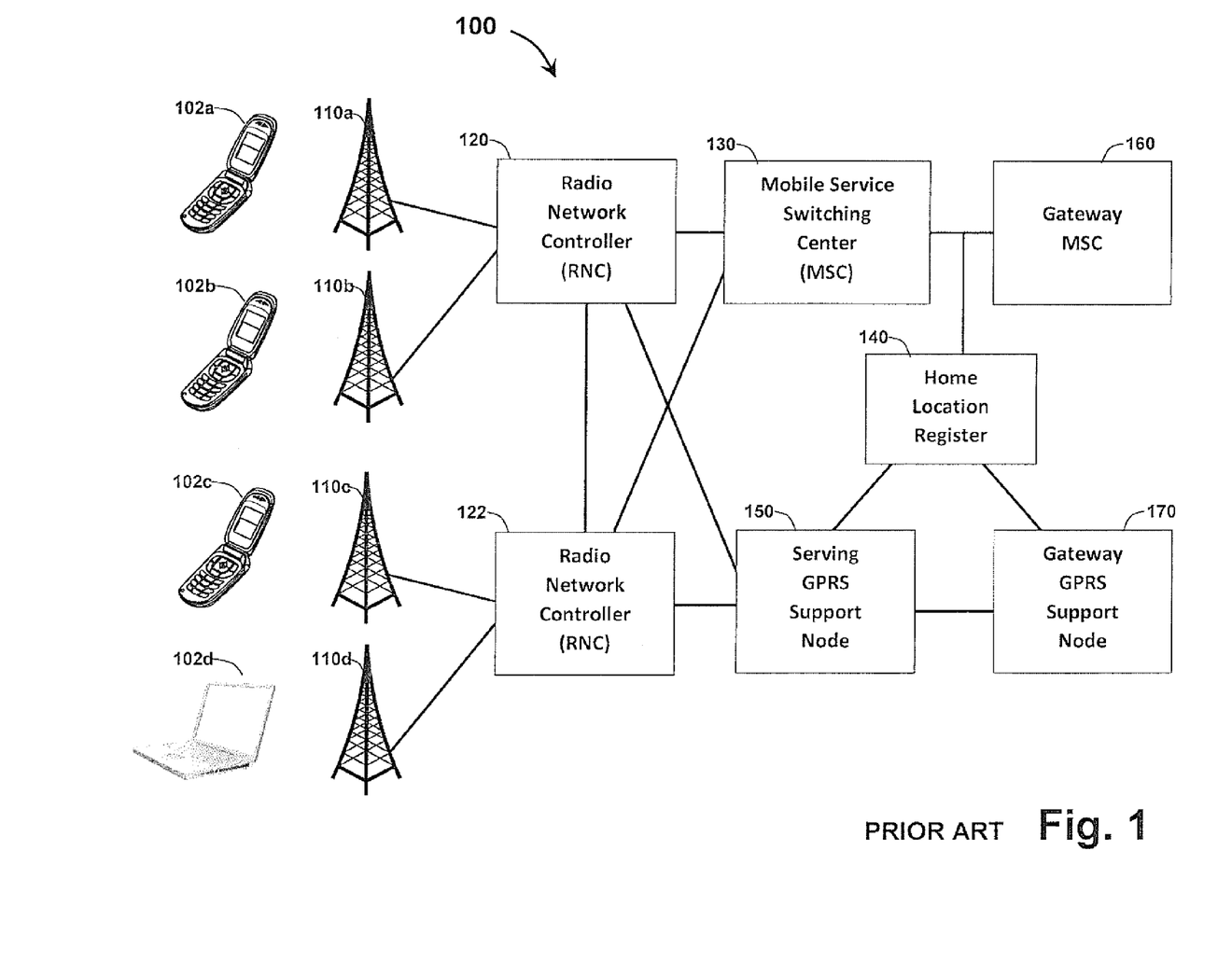
FIG. 1 illustrates an exemplary Universal Mobile Telecommunications Services (UMTS) network for providing various mobile services.

In FIG. 1 there may be seen a simplified block diagram 100 of a portion of a Universal Mobile Telecommunications Services (UMTS) network. Within this network may be found examples of network equipment such as Radio Network Controllers (RNCs) 120 and 122; Mobile Service Switching Centre (MSC) 130; Serving GPRS Support Node 150; Home Location Register Node 140, Gateway Mobile Switching Center 160; and Gateway GPRS Support Node 170. The Radio Network Controllers are connected to base stations 110, in FIG. 1 RNC 120 to NodeB base stations 110a and 110b; and RNC 122 to NodeB base stations 110c and 110d. NodeB base stations can be in radio contact with user equipment 102, depicted in FIG. 1 as handsets 102a, 102b, 102c, and 102d.

In operation the network elements communicate via connections which bind the individual network element to other network elements to form the overall network. The interfaces between network elements terminate on ports of each individual network element. According to the protocol of the specific network, particular messages are exchanged between network elements over the connections in order to accomplish various network functions such as setting up a call, handing off a connection, connecting a particular user equipment to a particular service, etc.

Figure 2:
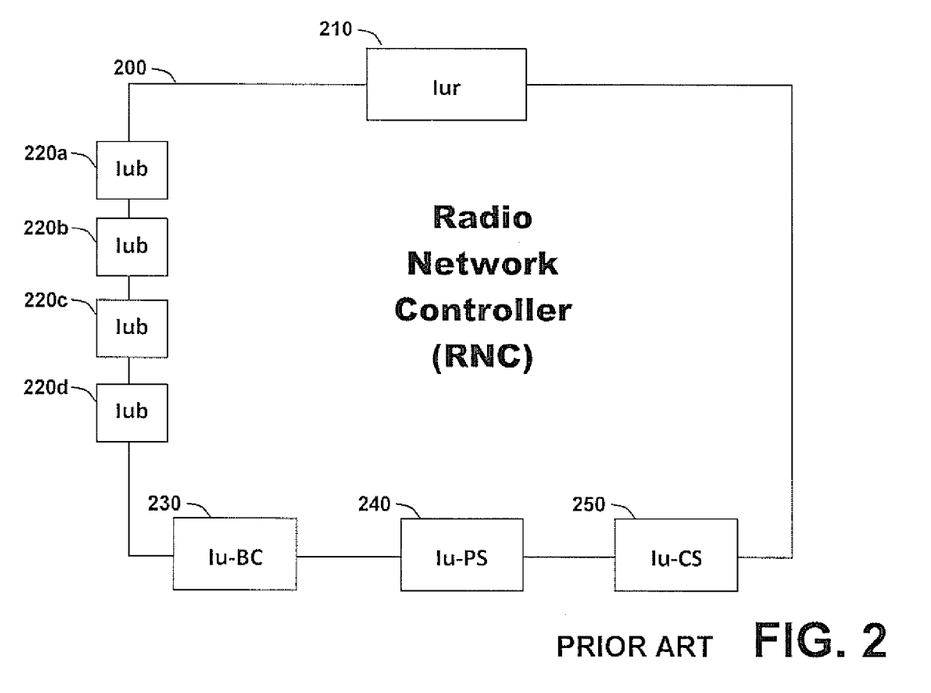
FIG. 2 illustrates an exemplary Radio Network Controller (RNC) with associated communication ports.

Referring now to FIG. 2 there may be seen a block diagram depicting the ports associated with an example Radio Network Controller network element 200 corresponding to references 120 and 122 of FIG. 1. As per the UMTS specification, RNC 200 has a plurality of ports by which it interfaces connections to other network elements. For the purposes of this explanation, the logical connections between network elements will be termed interfaces. The interface between RNCs, for example RNC 220 and RNC 222 of FIG. 1 is termed the Iur interface and may be seen on FIG. 2 as port 210 of RNC 200. The interface between the RNC and the NodeB units is termed the Iub interface and may be seen on FIG. 2 as ports 220a, 220b, 220c, and 220d of RNC 200. The interface between the RNC and the Cell Broadcast Center (CBC) is termed the Iu-BC interface and may be seen as port 230 of RNC 200. The interface between the RNC and the Serving GPRS Support Node (SGSN) is termed the Iu-PS interface as may be seen as port 240 of RNC 200. The interface between the RNC and the Mobile Switching Center is termed the Iu-CS interface as may be seen as port 250 of RNC 200. Messages over an interface are transmitted and received at ports and will be stored in port buffer memories as discussed regarding the next figure.

Figure 3:
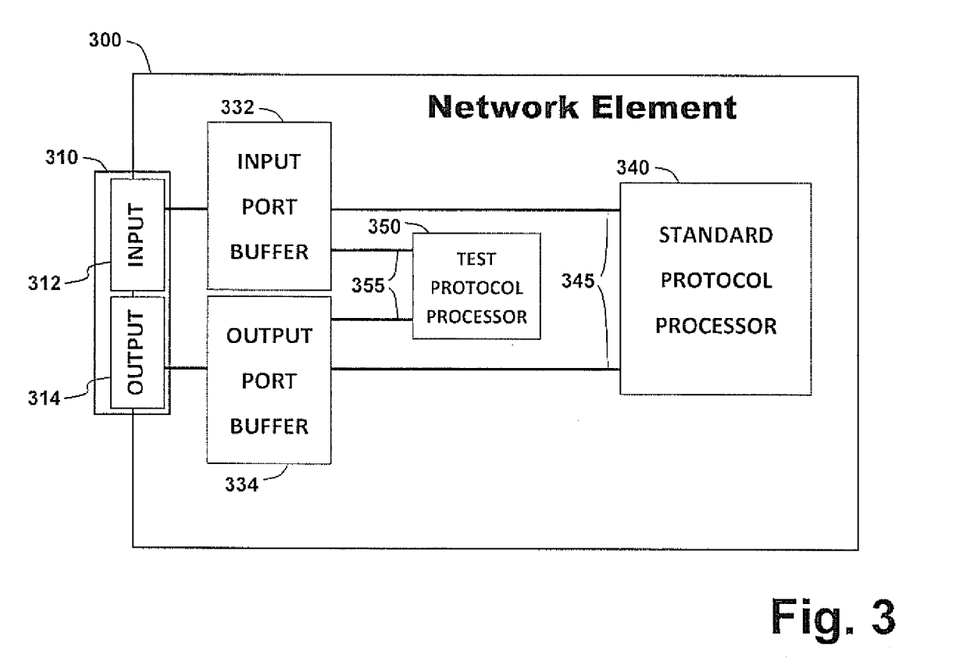
FIG. 3 illustrates an exemplary network element according to an embodiment of the invention.

Referring to FIG. 3 there may be seen a block diagram of an exemplary network element 300 according to an embodiment of the invention. Network element has an interface port 310 having an input port 312 and output port 314. Messages arriving at interface input port 312 are stored in input port buffer 332. Likewise, messages destined for transmission from interface output port 314 are stored in output port buffer 334.

Standard protocol processor 340 is connected to input port buffer 332 and output port buffer 334 via connections 345. Standard protocol processor 340 represents the hardware and hardware-with-software components of the network element 300 which processes messages received at the interface ports according to a particular protocol to which the incoming messages correspond and which generates messages for transmission from the interface ports also according to a particular protocol to which the outgoing messages correspond.

Standard protocol processor 340 retrieves a message from input port buffer 332, processes the message according to protocol, generates a response message (which may be for an interface port other than the interface port the message was received on), and places the response message into an output port buffer. If the outgoing message is for a second interface port other than a first interface port at which the message was received, then the output port buffer used will be the output port buffer associated with the second interface port.

Also connected to input port buffer 332 and output port buffer 334 via connections 355 is test protocol processor 350. Test protocol processor 350 represents the hardware and hardware-with-software components of the network element 300 which processes messages received at the interface ports and which generates messages for transmission from the interface ports according to the invention. Portions of the test protocol processor 350 may be coterminous with standard protocol processor 340, for example certain elements of hardware such as CPUs or memory may be commonly used by both protocol processors.

According to one embodiment of the invention, in operation test protocol processor 350 monitors input port buffer 332 and under certain conditions removes a message stored within input port buffer 332 prior to standard protocol processor 340 having retrieved it. Subsequently, test protocol processor 350 may replace the message after a delay; may alter the payload of the message and then replace the message; may alter the header of the message and then replace the message; or may not replace the message, effectively dropping the message.

The net result of each of these effects is to change the message, either in contents or in terms of arrival time, in order to examine the response of either the network element 300, or the response of the larger network in which network element 300 is a node. The nature of these changes allows testing of the network element or the larger network in-situ with specifically prescribed message compromising instances. These message compromising instances may be representative of, for example, network delays which may occur in the normal course of network operation.

According to one embodiment of the invention, test protocol processor 350 may replace a particular message in the port input buffer after a delay chosen from a random distribution of delay times. This random distribution may have a defined lower limit and a defined upper limit representative of the range of delays that could be incurred for messages arriving at this port. Further, the random distribution of delay times could be defined by some standard statistical distribution including a uniform random distribution, a truncated Normal random distribution, a truncated Poisson random distribution, or a truncated exponential random distribution.

Referring to FIG. 4 there may be seen a variety of random statistical distributions. In FIG. 4a a uniform random distribution is depicted, having a delay range with a lower delay limit 412 and an upper delay limit 414 and having an instantaneous probability 410 throughout the range. A specific delay value 416 is depicted as might result from a delay selection according to this statistical distribution.

Figure 4A:
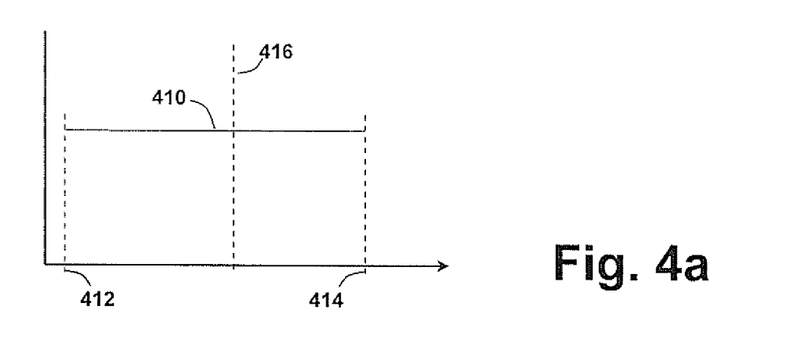
FIGS. 4a, 4b, 4c and 4d illustrates a set of exemplary statistical distributions used in generating a random value.
Figure 4B:
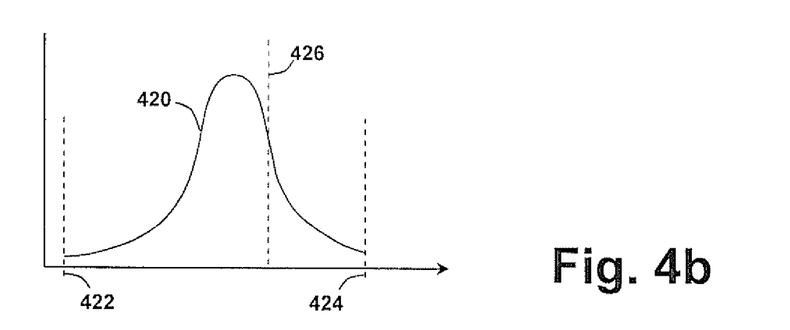

In FIG. 4b a truncated Normal random distribution is depicted, having a delay range with a lower delay limit 422 and an upper delay limit 424 and having an instantaneous probability 420 throughout the range. A specific delay value 426 is depicted as might result from a delay selection according to this statistical distribution.

Figure 4C:
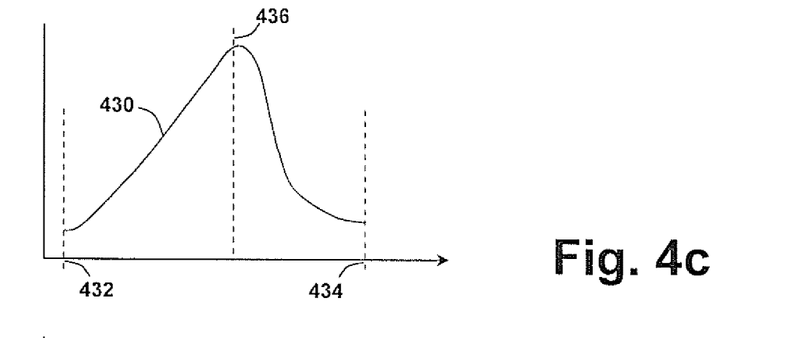

In FIG. 4c a truncated Poisson random distribution is depicted, having a delay range with a lower delay limit 432 and an upper delay limit 434 and having an instantaneous probability 430 throughout the range. A specific delay value 436 is depicted as might result from a delay selection according to this statistical distribution.

Figure 4D:
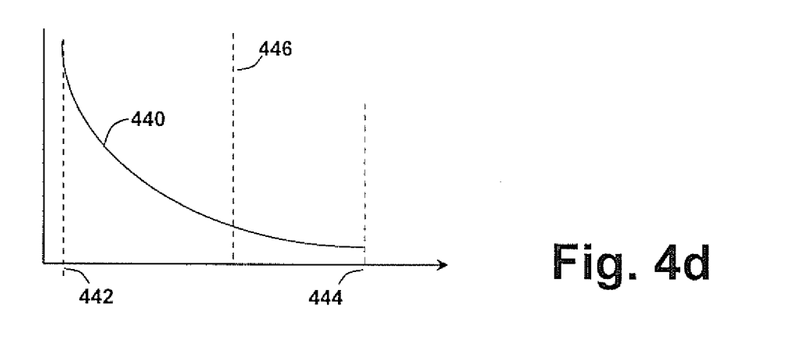

In FIG. 4d a truncated Exponential random distribution is depicted, having a delay range with a lower delay limit 442 and an upper delay limit 444 and having an instantaneous probability 440 throughout the range. A specific delay value 446 is depicted as might result from a delay selection according to this statistical distribution.

In application of these embodiments of the invention, the particular random statistical distribution may be chosen to represent the sort of distribution previously observed for messages in the particular network in which the network element of the invention is situated. Alternatively, the distribution may be chosen to demonstrate a particular performance response of the network element.

For example, under some circumstances it may be advantageous to select an appropriate distribution and then provide an upper limit representative of the average delay time. The resulting set of delays would be representative of messages arriving with delays at or below average. The response of the network element under test could be used to demonstrate the degree of impact on Key Performance Indicators that this particular network element contributes when the network is performing at average or below delay times.

According to another embodiment of the invention, the test protocol processor alters the payload of the message prior to returning the message to the input port buffer. This form of test could, for example, be used to evaluate the network element's response to erroneous content values contained in messages, in terms of recovery times and recovery paths taken.

Alternatively, according to another embodiment of the invention, the test protocol processor alters the message header, changing the message type. The alteration could be, for example, the substitution of a failure message in place of the received message. This form of test again could be used to evaluate the network element's response to failure messages, in terms of recovery times and recovery paths taken.

According to yet another embodiment of the invention, the test protocol processor does not return any message to the input port buffer. This form of test would represent the case where an incoming message was dropped.

Under one embodiment of the invention, the conditions under which the test protocol processor would remove a message from the input port buffer are defined in a reference table. The test protocol processor scans arriving messages and when a message corresponds to a message in the reference table, would remove the message from the input port buffer and take an action as correspondingly defined in the reference table. As aforementioned, the kind of actions could include delaying the particular message, changing the payload contents of the message, changing the message type, or even dropping the message. In some embodiments the reference table contains further particulars, for example if a delay is to be incurred by the message the reference table could detail a specific delay or a range of delays. The range could be specified by an upper and lower limit or could also or independently consist of a function reference to a particular type of random distribution with particular characteristics.

In operation the test protocol processor 350 is enabled as part of a testing scenario. The enabling could be via specific operator instructions or automatically in response to an automatic test routine.

According to another embodiment of the invention, in operation test protocol processor 350 monitors output port buffer 334 and under certain conditions removes a message stored within output port buffer 334 prior to the message being sent out over the interface over output port 314. Subsequently, test protocol processor 350 may replace the message after a delay; may alter the payload of the message and then replace the message; may alter the header of the message and then replace the message; or may not replace the message, effectively dropping the message.

The net result of each of these effects is to change the message, either in contents or in terms of arrival time, in order to examine the response of the network element adjacent to network element 300, and additionally the response of the larger network in which the network element adjacent to network element 300 is a node. The embodiment of the invention provides a means of testing adjacent network elements which do not have an embodiment of the invention therein, thus extending the use of the invention.

As per the message delays and alterations, or even message drops, performed on messages in the input port buffer 332, in this embodiment of the invention the test protocol processor may apply all of the same message modifications as previously disclosed in relation to input port buffer 332.

In operation these modifications, delays, and dropping of messages in output port buffer 334 could be triggered by particular message types defined in a reference table. Associated with each message type would be the particular operation that the test protocol processor 350 would perform, including specifics of for example: delay times; message payload changes; message type changes; and instances where the message is to be dropped.

As per the earlier embodiments, in operation the test protocol processor 350 is enabled as part of a testing scenario. The enabling could be via specific operator instructions or automatically in response to an automatic test routine.

As per normal network test procedures, responses of the network element 300 and interacting network elements would be captured in a trace file and logged in a database for later analysis.

According to another embodiment of the invention the operation of the test protocol processor is made dependent upon a random statistic in the event that it identifies a predetermined message. The application of the random statistic may occur once or multiple times in determining what operation the test protocol process will take. According to one version of this embodiment, a value is determined according to a random or pseudo-random process. The value is then compared to a threshold value. If the determined value is to one side of the threshold value, for example greater than the threshold value, then the operation of the test protocol processor may be to ignore the presence of the predetermined message in this instance. In the event that the determined value is equal or to the other side of the threshold value, then the operation of the test protocol processor may be to remove the message from the port buffer. In this embodiment a random statistic is used to establish the frequency of the test protocol processor interacting with the port buffer in the event that a predetermined message type is placed in the buffer. In this embodiment the random statistic determines whether a message is removed from the port buffer at all, thus potentially curtailing the addition of delays or modification of the message.

According to another embodiment of the invention, the provision of a delay is made contingent upon a random statistic. According to one version of this embodiment, a value is determined according to a random or pseudo-random process. The value is then compared to a threshold value. If the determined value is to one side of the threshold value, for example greater than the threshold value, then the operation of the test protocol processor may be to remove the message from the port buffer and return the message after some determined delay. In some versions of this embodiment the delay may be a particular fixed value, while in other versions the delay period may be determined by choosing a delay from a random distribution of delay times. This random distribution may have a defined lower limit and a defined upper limit representative of the range of delays that could be incurred for messages arriving at this port. Further, the random distribution of delay times could be defined by some standard statistical distribution including a uniform random distribution, a truncated Normal random distribution, a truncated Poisson random distribution, or a truncated exponential random distribution.

According to another embodiment of the invention the operation of the test protocol processor is made dependent upon a random statistic in the event that it identifies a predetermined message. According to one version of this embodiment, a value is determined according to a random or pseudo-random process. The value is then compared to a threshold value. If the determined value is to one side of the threshold value, for example greater than the threshold value, then the operation of the test protocol processor may be to remove the message from the port buffer and return the message after modifying the payload of the message.

According to another embodiment of the invention the operation of the test protocol processor is made dependent upon a random statistic in the event that it identifies a predetermined message. According to one version of this embodiment, a value is determined according to a random or pseudo-random process. The value is then compared to a threshold value. If the determined value is to one side of the threshold value, for example greater than the threshold value, then the operation of the test protocol processor may be to remove the message from the port buffer and return the message after modifying the payload of the message. Alternatively this operation may be triggered by the determined value being equal to or to the other side of the threshold value, for example less than or equal to the threshold value.

According to yet another embodiment of the invention the operation of the test protocol processor is made dependent upon a random statistic in the event that it identifies a predetermined message. According to one version of this embodiment, a value is determined according to a random or pseudo-random process. The value is then compared to a threshold value. If the determined value is to one side of the threshold value, for example greater than the threshold value, then the operation of the test protocol processor may be to remove the message from the port buffer and return the message after modifying the header of the message. This operation would be used in conjunction with changing the message type, for example to that of a failure message. Alternatively this operation may be triggered by the determined value being equal to or to the other side of the threshold value, for example less than or equal to the threshold value.

According to an embodiment of the invention, a series of tests are made against a random or pseudo-random statistic and the cumulative results of the individual tests determine in sum what operations the test protocol processor performs on a message in a port buffer.

Figure 5:
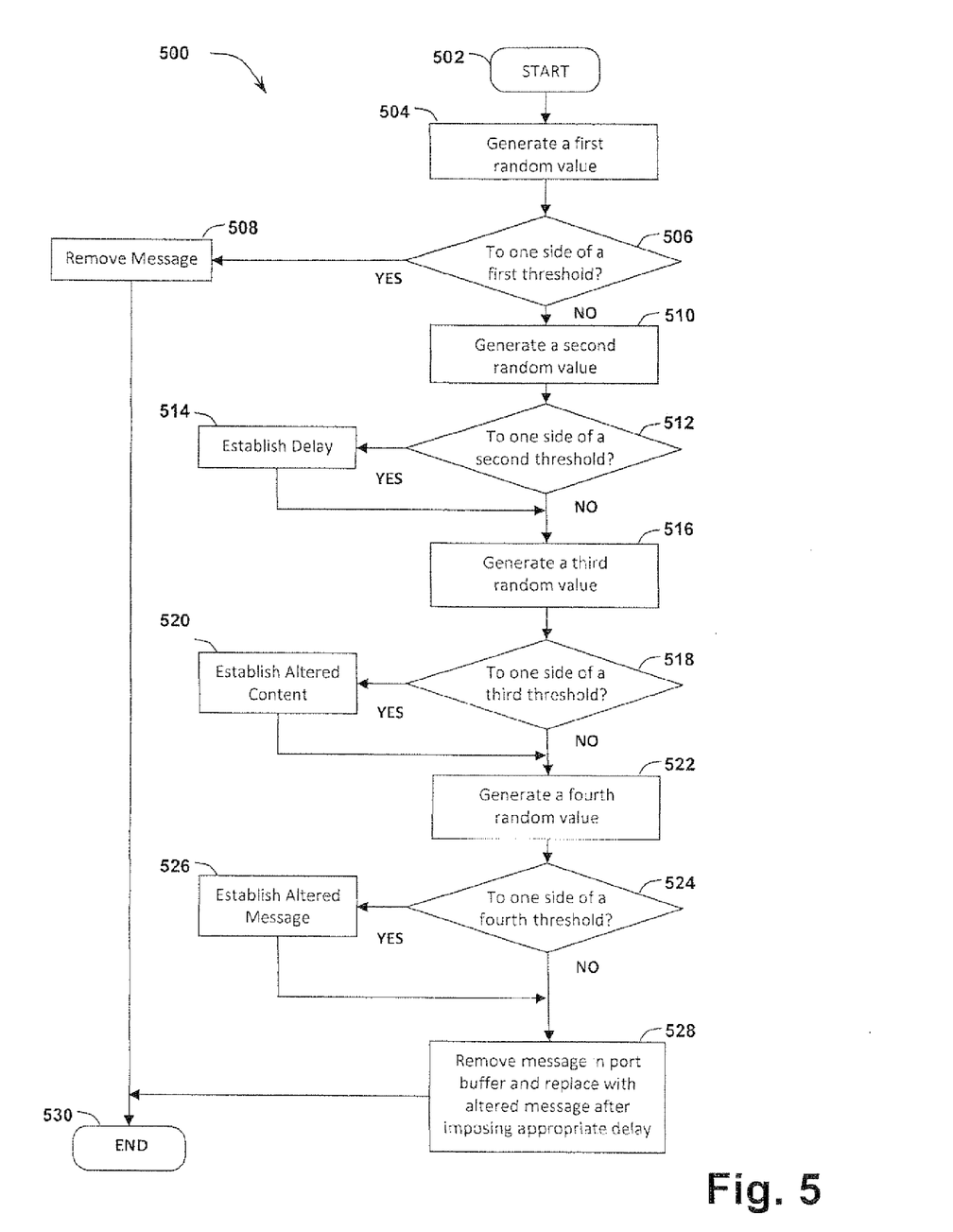
FIG. 5 illustrates a process flow diagram according to an embodiment of the invention.

By way of example, and referring now to FIG. 5 there may be seen a process flow diagram 500 providing a method according to a version of this embodiment of the invention.

The process commences at step 502. At step 504 a first random value is generated. This first generated value is compared to a first reference threshold at step 506 and if the first random value is to one side of the first reference threshold, then control proceeds to step 508 where the message is removed from the port buffer. Control then proceeds to step 530 where the process ends. This particular path through the process would represent an instance where a message would be removed from the port buffer and dropped.

In the event that step 506 determined that the first random value was to the other side or equal to the first threshold, control proceeds from step 506 to step 510 where a second random value is generated. This second generated value is compared to a second reference threshold at step 512 and if the second random value is to one side of the second reference threshold, then control proceeds to step 514 where a particular delay is established. This delay may be established via reference to a reference table or may be a delay generated from a statistical distribution, for example any distributions of the forms described in FIG. 4. Control then proceeds to step 516.

In the event that step 512 determined that the second random value was to the other side or equal to the second threshold, control proceeds from step 512 to step 516. At step 516 a third random value is generated. This third generated value is compared to a third reference threshold at step 518 and if the third random value is to one side of the third reference threshold, then control proceeds to step 520 where a particular altered content for the message is established. Control then proceeds to step 522.

In the event that step 518 determined that the third random value was to the other side or equal to the third threshold, control proceeds from step 518 to step 522. At step 522 a fourth random value is generated. This fourth generated value is compared to a fourth reference threshold at step 524 and if the fourth random value is to one side of the fourth reference threshold, then control proceeds to step 526 where a particular altered header for the message is established. The altered header will change the message type. In some cases the message type could be changed to that of a failure message. Control then proceeds to step 528.

In the event that step 524 determined that the fourth random value was to the other side or equal to the fourth threshold, control proceeds from step 524 to step 528.

At step 528 the message in the port buffer is removed and replaced with the altered message resulting from steps 520 and 526 after imposing the particular delay determined at step 514. Note that the resulting replacement message may incur only a delay, only a payload contents alteration, only a header alteration, or any combination of these conditions, dependent upon the random values generated and the results of the test steps. Control then proceeds to step 530 where the process ends.

Accordingly, this embodiment of the invention uses a cascaded set of tests using random distributions to determine what alterations and delays are to be imposed upon a particular message. This embodiment may find preferable application wherein the statistical distributions for the frequency of a dropped message, a delayed message, a message with altered contents, and a message with altered type are known and different. As each statistical distribution is independently applied, this embodiment allows individual adjustment of the distributions determining the application of the particular condition.

Figure 6:
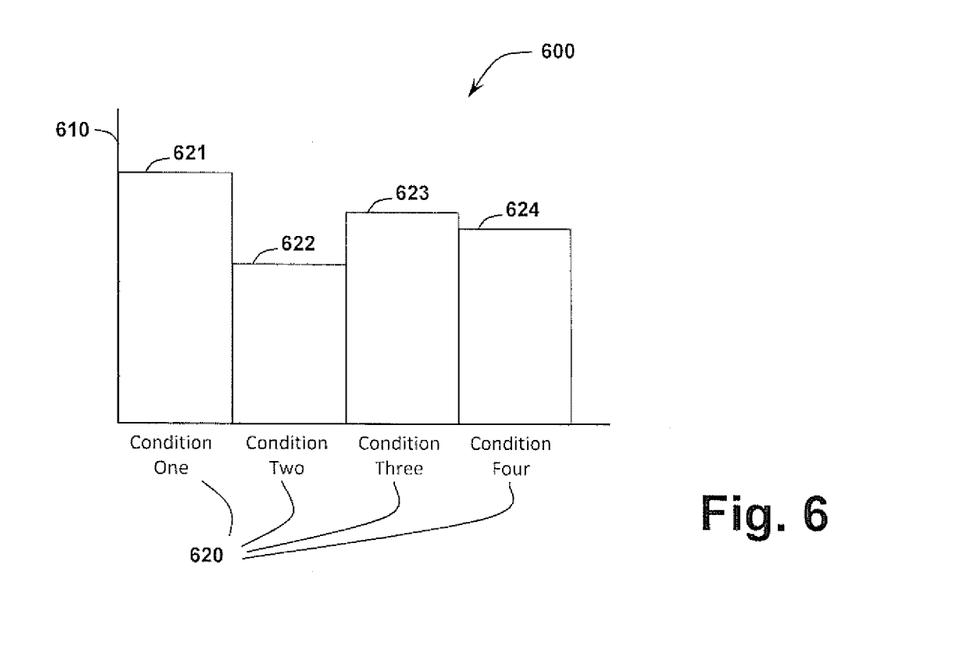
FIG. 6 illustrates a weighted statistical distribution according to an embodiment of the invention.

According to a different embodiment of the invention, a different form of determination according to a random distribution is used. Referring now to FIG. 6 there may be seen a distribution 600 having a statistical likelihood value as per axis 610 and distinct likelihoods 621, 622, 623, and 624. These distinct likelihoods are each respectively associated with conditions 620. In operation the distribution 600 defines the likelihood that one of the particular conditions would be applied to a given predetermined message. For example, condition one could represent the case of dropping the message and have a likelihood of 25%. Condition two could represent the case of delaying the message and have a likelihood of 20%. Condition three could represent the case of altering the message contents and have a likelihood of 26%. Condition four could represent the case of altering the message header (message type) and have a likelihood of 24%.

In this embodiment a single statistical distribution, distribution 600, is used to determine which condition will be applied to the message. Due to the separate conditions specified in distribution 600, only one of the conditions will be applied to a predetermined message in this embodiment.

Figure 7:
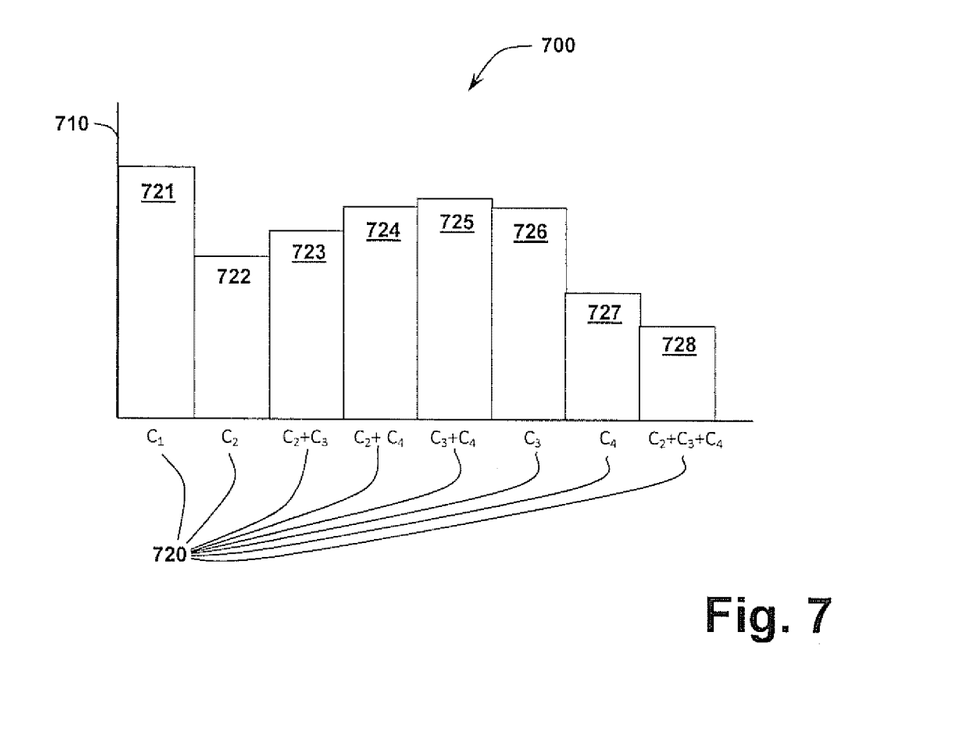
FIG. 7 illustrates a weighted statistical distribution according to a different embodiment of the invention.

Referring to FIG. 7 there is depicted an alternate statistical distribution 700 which provides for a single statistical distribution allowing multiple conditions to be applied to a replacement message. In FIG. 7 there may be seen a distribution 700 having a statistical likelihood value as per axis 710 and distinct likelihoods 721, 722, 723, 724, 725, 726, 727, and 728. These distinct likelihoods are each respectively associated with situations 720. Each situation of situations 720 is associated with the application of one or more conditions, and each situation is associated with a respective likelihood. By way of example, allow condition $C_1$ to represent dropping a message, $C_2$ to represent delaying a message, $C_3$ to represent altering a message contents, and $C_4$ to represent altering a message's header or message type. Then, likelihood 721 which corresponds to $C_1$ is the likelihood of dropping a message according to distribution 700. Likewise, likelihood 722 which corresponds to $C_2$ is the likelihood of simply delaying a message according to distribution 700, while likelihood 723 which corresponds to conditions $(C_2+C_3)$ is the likelihood of both delaying a message and altering the message's payload, and likelihood 728 which corresponds to conditions $(C_2+C_3+C_4)$ is the likelihood of delaying a message and altering the message's payload contents and type. In operation the distribution 700 defines the likelihood that one particular set of combinations of the particular conditions would be applied to a given predetermined message.

In this embodiment a single statistical distribution, distribution 700, is used to determine which set of conditions will be applied to the message. Due to the separate situations specified in distribution 700, each particular combinatorial set of the conditions can have a separate likelihood assigned.

Figure 8:
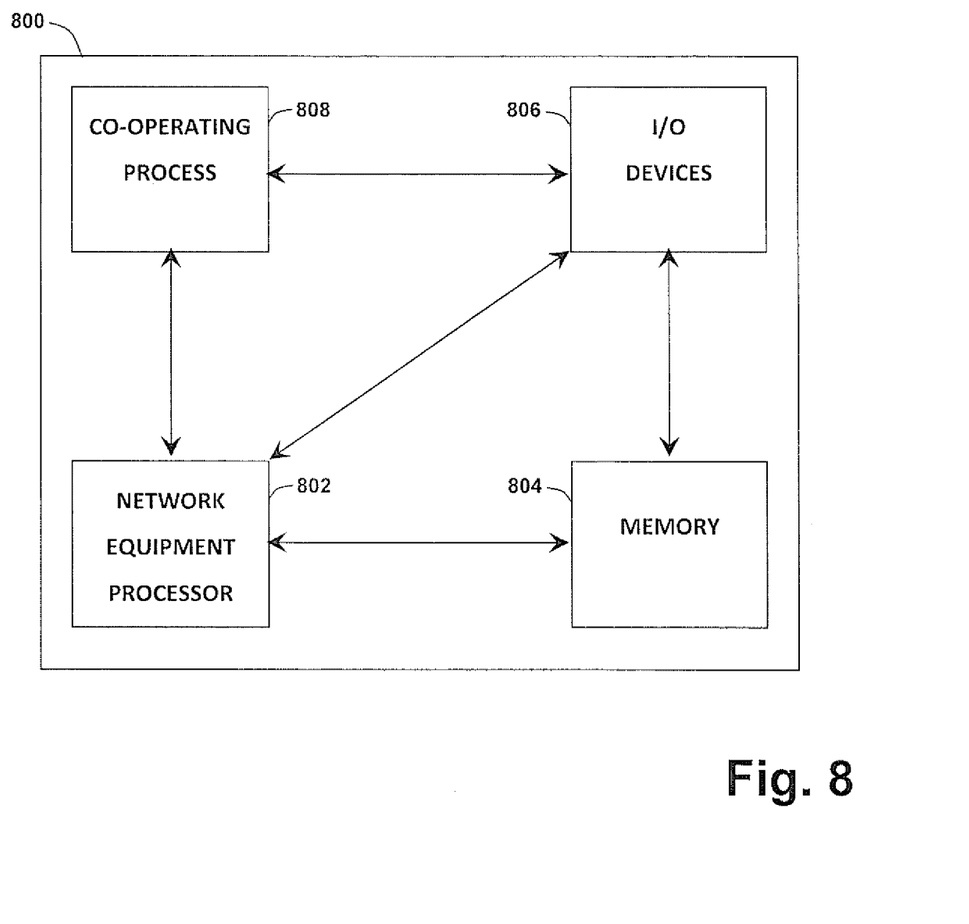
FIG. 8 illustrates an exemplary network element protocol processor assembly according to an embodiment of the invention.

FIG. 8 depicts a high-level block diagram of a network equipment protocol processor assembly suitable for use in performing functions described herein.

As depicted in FIG. 8, network equipment protocol processor assembly 800 includes a network equipment processor element 802 (e.g., a central processing unit (CPU) and/or other suitable processor(s)), a memory 804 (e.g., random access memory (RAM), read only memory (ROM), and the like), a cooperating module/process 808, and various input/output devices 806 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in hardware, for example using one or more application specific integrated circuits (ASIC), and/or any other hardware equivalents. Alternatively, according to one embodiment, the cooperating process 808 can be loaded into memory 804 and executed by network equipment processor 802 to implement the functions as discussed herein. As well, cooperating process 808 (including associated data structures) can be stored on a tangible, non-transitory computer readable storage medium, for example magnetic or optical drive or diskette, semiconductor memory and the like.

Accordingly, what has been disclosed is an apparatus and associated method which provides for the statistical control of the removal of messages from port buffers and subsequent dropping, delaying or alteration of the messages prior to their return to the port buffer. According to some embodiments of the invention the statistical control is performed on an event by event basis by making separate statistical determinations as to whether a message drop, message delay, message payload change or message header or type change occurs. According to other embodiments a single test is made against a predetermined distribution which defines the likelihoods of a single condition being applied. In other embodiments a single test is made against a predetermined distribution which defines the likelihoods of particular combinations of conditions being applied. In all the embodiments, in the event that the port buffer is an input port buffer, the message removal, alteration and replacement (if the message is not dropped) is done prior to the standard protocol processor of the network element having retrieved the message from the input port buffer. In the event that the port buffer is an output port buffer, the message removal, alteration and replacement (if the message is not dropped) is done prior to the message being transmitted from the output port buffer. Thus, what has been provided is a method to test a network element in situ in a customer network. In particular, a means has been disclosed by which the response of a particular network element to a plurality of problematic messaging conditions could be demonstrated under predetermined statistical regimes.

It is contemplated that some of the steps discussed herein as methods may be implemented within hardware, for example, as circuitry that cooperates with the network equipment processor to perform various method steps. Portions of the functions/elements described herein may be implemented as a computer program product wherein computer instructions, when processed by a network equipment processor, adapt the operation of the network equipment processor such that the methods and/or techniques described herein are invoked or otherwise provided. Instructions for invoking the inventive methods may be stored in fixed or removable media, and/or stored within a memory within a computing device operating according to the instructions. It is to be understood that various changes in the details, materials, and arrangements of the parts which have been described and illustrated in order to explain the nature of this invention may be made by those skilled in the art without departing from the scope of the invention as expressed in the following claims.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation." Numerous modifications, variations and adaptations may be made to the embodiment of the invention described above without departing from the scope of the invention, which is defined in the claims.

What is claimed is:

1. A network element comprising:
a port having a port buffer;
a standard protocol processor which processes messages stored in said port buffer; and a test protocol processor having access to said port buffer; wherein said test protocol processor is configured to: generate a first value according to a first statistical distribution in the event that a first protocol message stored in said port buffer corresponds to a predetermined message type; compare said first value to a first threshold; and remove said first protocol message from said port buffer if said first value is to one side of said first threshold.

2. The network element of claim 1 wherein said test protocol processor is further configured to: generate a second value according to a second statistical distribution if said first value is to another side of said first threshold; compare said second value to a second threshold; associate a delay with said first protocol message if said second value is to one side of said second threshold; remove said first protocol message from said port buffer for a period of said associated delay; and then return said first protocol message to said port buffer.

3. The network element of claim 2 wherein said test protocol processor is further configured to, prior to said return step: generate a third value according to a third statistical distribution; compare said third value to a third threshold; and associate a change in message contents with said first protocol message if said third value is to one side of said third threshold; provide said associated change in message contents to said first protocol message.

4. The network element of claim 3 wherein said test protocol processor is further configured to, prior to said return step: generate a fourth value according to a fourth statistical distribution; compare said fourth value to a fourth threshold; and associate a change in message type with said first protocol message if said fourth value is to one side of said fourth threshold; provide said associated change in message type to said first protocol message.

5. The network element of claim 4 wherein said associated change in message type is that of a failure message.

6. The network element of claim 2 wherein said delay is chosen from a range of delays having a lower delay limit and an upper delay limit.

7. The network element of claim 6 wherein a chance of said delay being a particular delay is defined by a random distribution.

8. The network element of claim 7 wherein the random distribution is one of the set of a uniform random distribution, a truncated Normal random distribution, a truncated Poisson random distribution, and a truncated exponential random distribution.

9. The network element of claim 1 wherein said first statistical distribution is one of the set of a uniform random distribution, a truncated Normal random distribution, a truncated Poisson random distribution, and a truncated exponential random distribution.

10. The network element of claim 2 wherein said second statistical distribution is one of the set of a uniform random distribution, a truncated Normal random distribution, a truncated Poisson random distribution, and a truncated exponential random distribution.

11. The network element of claim 3 wherein said third statistical distribution is one of the set of a uniform random distribution, a truncated Normal random distribution, a truncated Poisson random distribution, and a truncated exponential random distribution.

12. The network element of claim 4 wherein said fourth statistical distribution is one of the set of a uniform random distribution, a truncated Normal random distribution, a truncated Poisson random distribution, and a truncated exponential random distribution.

13. The network element of claim 1 wherein said port buffer comprises an input port buffer of said network element; and said removing step occurs prior to said standard protocol processor processing said message.

14. The network element of claim 1 wherein said port buffer comprises an output port buffer of said network element and said removing step occurs prior to transmission of said first protocol message from said port.

15. The network element of claim 1 wherein said predetermined message type is one of a plurality of predetermined message types.

16. A network element comprising:
a port having a port buffer;
a standard protocol processor which processes messages stored in said port buffer; and
a test protocol processor having access to said port buffer; wherein said test protocol processor is configured to: generate a first value according to a first statistical distribution in the event that a first protocol message stored in said port buffer corresponds to a predetermined message type; select a condition to apply to said first protocol message according to said first value.

17. The network element of claim 16 wherein said test protocol processor is further configured to: during the selecting step, select a condition from among the set of removing said first protocol message from said port buffer, removing said first protocol message from said port buffer and replacing it after a delay, removing said first protocol message from said port buffer and replacing it after altering the message payload contents, and removing said first protocol message from said port buffer and replacing it after altering the message type.

18. The network element of claim 17 wherein the message type is altered to that of a failure message.

19. The network element of claim 17 wherein said delay is chosen from a range of delays having a lower delay limit and an upper delay limit.

20. The network element of claim 19 wherein a chance of said delay being a particular delay is defined by a random distribution.

21. The network element of claim 20 wherein the random distribution is one of the set of a uniform random distribution, a truncated Normal random distribution, a truncated Poisson random distribution, and a truncated exponential random distribution.

22. The network element of claim 16 wherein the first statistical distribution comprises a weighted value corresponding to said condition.

23. A network element comprising:
a port having a port buffer;
a standard protocol processor which processes messages stored in said port buffer; and
a test protocol processor having access to said port buffer; wherein said test protocol processor is configured to: generate a first value according to a first statistical distribution in the event that a first protocol message stored in said port buffer corresponds to a predetermined message type; select a combination of conditions to apply to said first protocol message according to said first value.

24. The network element of claim 23 wherein said combination of conditions comprises: removing said first protocol message from said port buffer; or alternatively: selecting at least one condition from among the set of conditions of removing said first protocol message from said port buffer and replacing it after a delay, removing said first protocol message from said port buffer and replacing it after altering the message payload contents, and removing said first protocol message from said port buffer and replacing it after altering the message type; and applying the selected conditions.

25. The network element of claim 24 wherein the message type is altered to that of a failure message.

26. The network element of claim 24 wherein said delay is chosen from a range of delays having a lower delay limit and an upper delay limit.

27. The network element of claim 26 wherein a chance of said delay being a particular delay is defined by a random distribution.

28. The network element of claim 27 wherein the random distribution is one of the set of a uniform random distribution, a truncated Normal random distribution, a truncated Poisson random distribution, and a truncated exponential random distribution.

29. A method of testing a performance indicator for a network element having a port having a port buffer; a standard protocol processor which processes messages stored in said port buffer; a test protocol processor having access to said port buffer, and said test protocol processor configured to execute the method; said method comprising the steps of:
generating a first value according to a first statistical distribution in the event that a first protocol message stored in said port buffer corresponds to a predetermined message type;
selecting a condition to apply to said first protocol message according to said first value.

30. The method of testing as claimed in claim 29 further comprising the step of:
selecting, during the selecting step, a condition from among the set of removing said first protocol message from said port buffer,
removing said first protocol message from said port buffer and replacing it after a delay,
removing said first protocol message from said port buffer and replacing it after altering the message payload contents, and
removing said first protocol message from said port buffer and replacing it after altering the message type.

31. The method of testing as claimed in claim 30 wherein the message type is altered to that of a failure message.

32. The method of testing as claimed in claim 29 wherein said port buffer comprises an input port buffer of said network element; and said test protocol processor removes said first protocol message prior to said standard protocol processor processing said message.

33. The method of testing as claimed in claim 29 wherein said port buffer comprises an output port buffer of said network element and said test protocol processor removes said first protocol message prior to transmission of said first protocol message from said port.

34. The method of testing as claimed in claim 29 wherein said predetermined message type is one of a plurality of predetermined message types.

* * * * *